Figure 1:
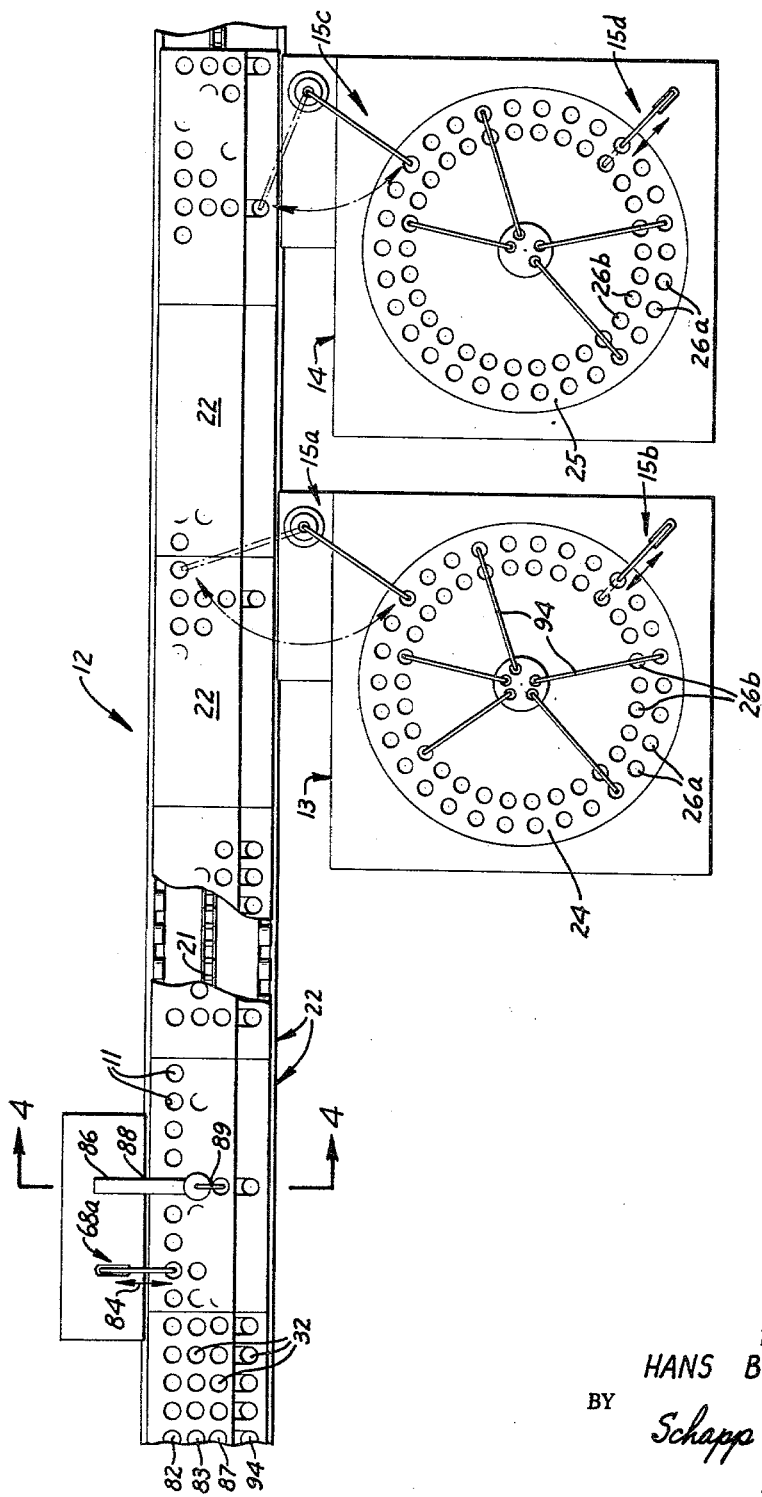

INVENTOR.
HANS BARUCH

July 6, 1965    H. BARUCH    3,193,358
AUTOMATED ANALYTICAL APPARATUS
Filed July 2, 1962    4 Sheets-Sheet 3
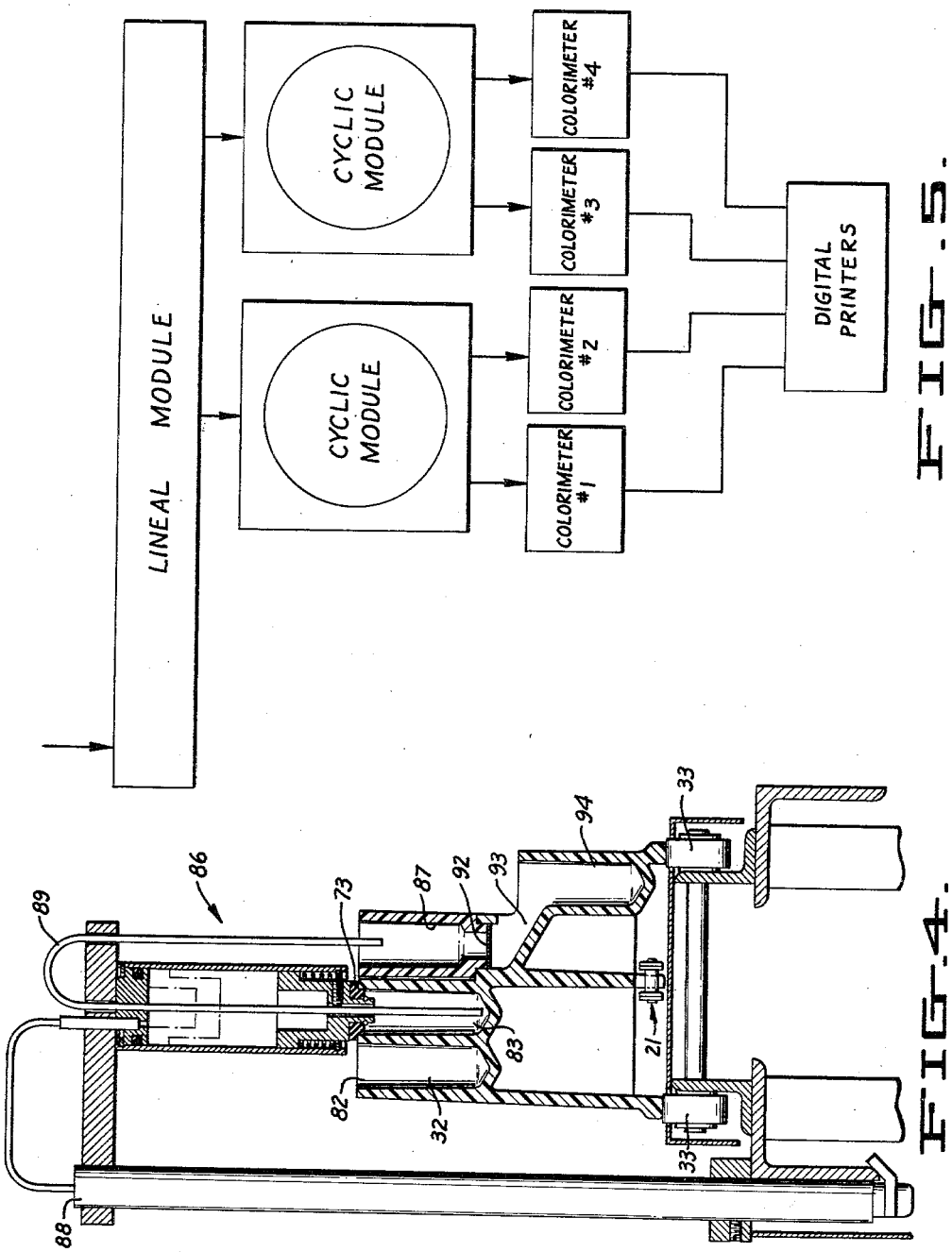
INVENTOR.
HANS BARUCH
BY
Schapp & Hatch
ATTORNEYS

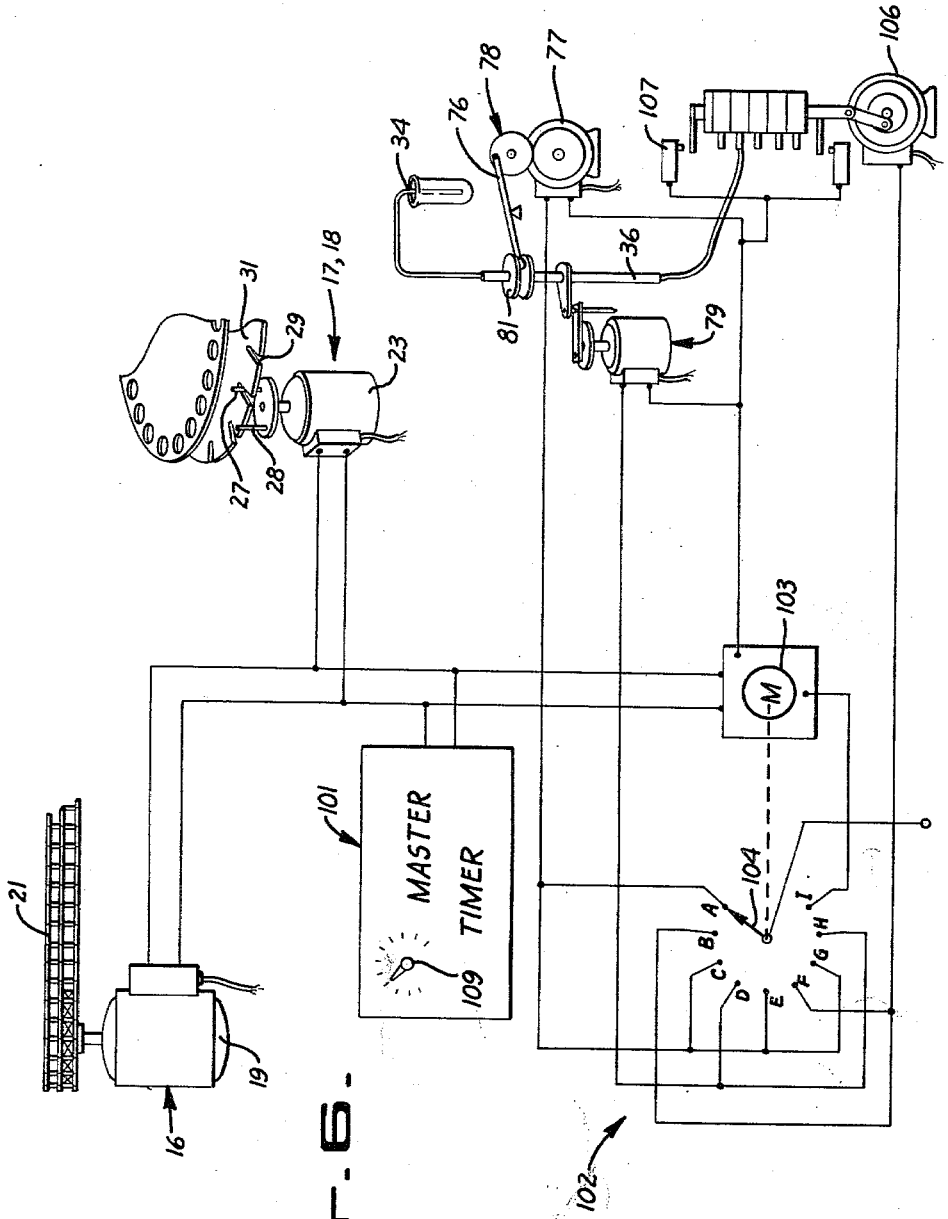

United States Patent Office 3,193,358
Patented July 6, 1965

3,193,358
AUTOMATED ANALYTICAL APPARATUS
Hans Baruch, Berkeley, Calif., assignor, by mesne assignments, to Warner-Lambert Pharmaceutical Company, Morris Plains, N.J.
Filed July 2, 1962, Ser. No. 207,124
14 Claims. (Cl. 23—253)

This invention relates to improvements in an automated analytical apparatus, and more particularly to an apparatus suitable for handling and treating liquid samples in accordance with standard analytical procedures.

Many types of chemical analyses require the processing of a great number of samples of similar character. The repetitive performance of similar operations lends itself to automation. The use of automatic analyzing equipment can result in material savings in the time of the operator, and has the further advantage of increasing the accuracy of the determinations by reducing the chance of error.

The manipulatory functions to be carried out in performing analyses may be relatively simple or quite complex. It is desirable to carry out the complex operations as well as the comparatively simple operations in an automatic system. Thus the conditioning of the sample, that is, the preliminary procedures which may be required to effect a desired detectable physical change in the sample such as accurate measuring of predetermined quantities of sample, addition of precise quantities of diluent or reagents or other materials thereto, performance of manipulatory functions on the sample such as filtering, stirring, etc., and control of the physical environment of the sample, should be carried out precisely and automatically. During these operations the samples should be maintained in desired sequential relationship in such manner that a particular sample may be identified at any time, and the individual samples should be protected against cross-contamination.

It is also desirable to provide an apparatus which is of modular construction permitting the use of various types of sample conditioning and detecting apparatus whereby the basic apparatus may easily and quickly be converted from one mode of analysis to another.

In its basic aspects the apparatus of the present invention performs repetitive sequences of analytical procedures upon each sample in such manner that each sample receives exactly the same treatment as each of the other samples. In order to provide the desired versatility, the apparatus is constructed and programmed to provide precisely controlled but adjustable time periods in which chemical reactions and other procedures take place. This is accomplished by advancing the samples in a row along a predetermined path of movement in intermittent stop and go fashion so that each sample arrives at a station, stays at such station for a predetermined length of time, and then moves on to the next station, with the entire cycle being precisely controlled as to duration by a master timer unit. Adjustment of the time period during which sample conditioning procedures are carried out is accomplished geometrically by relative positioning of the conditioning means and detecting means so as to increase or decrease the number of stations therebetween. In this manner, any time period which is a multiple of the timed cycle of movement of the samples may be chosen.

Provision is made in the material-handling and transferring apparatus to ensure that the particular sample being handled will not be contaminated by residue from preceding samples. The automated nature of the apparatus makes this provision essential to the proper functioning thereof Accordingly it is a principal object of the present invention to provide an automated analytical apparatus which is adapted to carry out certain of the complex steps utilized in standard analytical procedures, and which is adapted to function as a component, or module, of a modularized automated system containing any other components necessary to provide all of the necessary analytical steps and procedures to provide the desired determination.

Another object of the present invention is to provide an automated analytical apparatus of the character described which will maintain the samples in the same sequential relationship with respect to the other samples during the entire period so as to make each and every individual sample readily identifiable at all times.

A further object of the invention is the provision, in automated analytical apparatus of the character described, of material-handling means which is capable of measuring and transferring a given amount of sample without contamination by residue from previously handled samples.

A still further object of the invention is to provide an apparatus of the character described in which each cycle of analytical procedures are precisely controlled as to duration by a master timer unit, and in which variations in the duration of the different analytical steps are controlled by the geometrical positioning of the components.

Further objects and advantages of my invention will appear as the specification continues, and the new and useful features of my automated analytical apparatus will be fully defined in the claims attached hereto.

Figure 2:
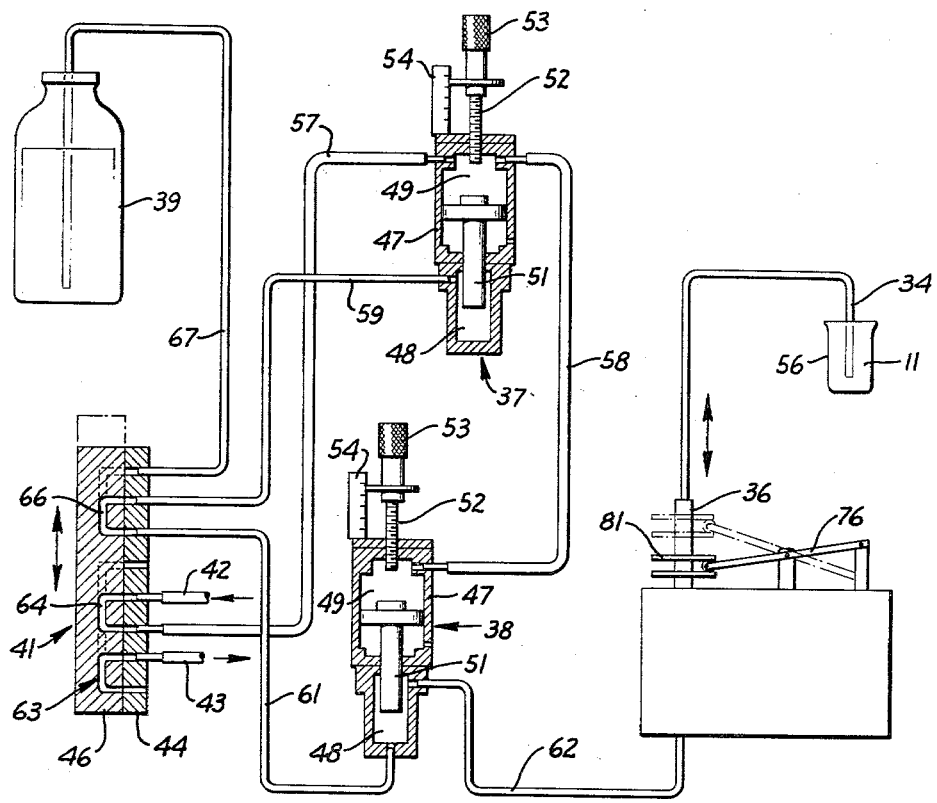
Figure 3:
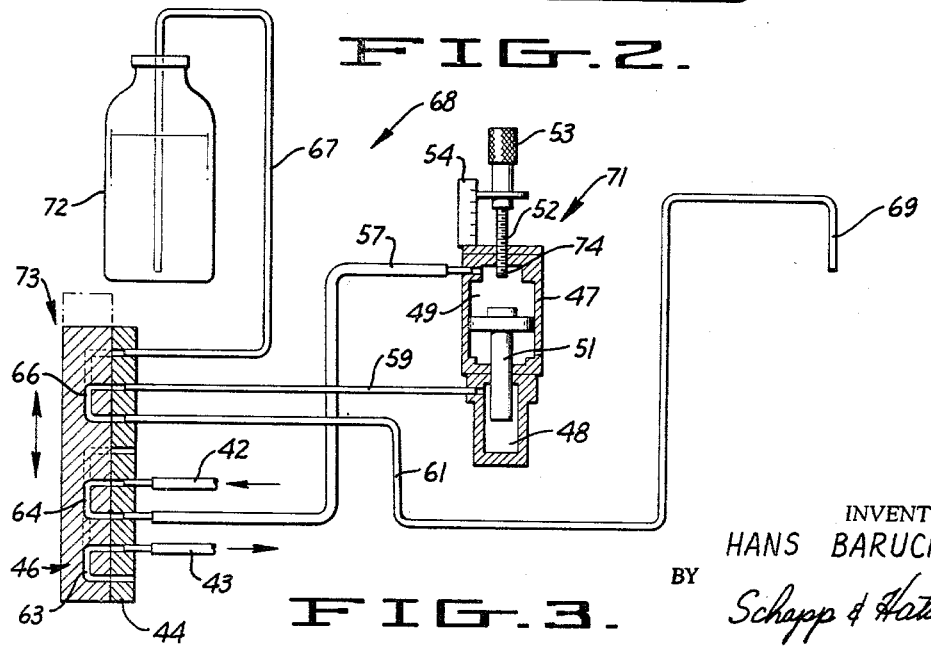

The preferred forms of my invention are illustrated in the accompanying drawings, forming part of this description, in which:

FIGURE 1 is a schematic plan view illustrating several modules of this invention and the manner in which they may be coordinated to provide a series of determinations on a blood sample;

FIGURE 2, a schematic elevational view showing certain of the parts in section, and illustrating a fluid-handling component utilized in the present invention;

FIGURE 3, a schematic elevational view with certain components shown in section, illustrating another fluid-handling apparatus that may be utilized as a component of the present invention;

FIGURE 4, a cross-sectional view taken substantially in the plane of line 4—4 of FIGURE 1;

FIGURE 5, a diagrammatic showing of how certain modules cooperate to provide a completely automated analysis; and FIGURE 6, a schematic circuit diagram of the means for activating components in a desired timed cycle.

While I have shown only certain preferred forms of my invention, it should be understood that various changes or modifications may be made within the scope of the claims hereto attached without departing from the spirit of the invention.

The automated analytical equipment of the present invention, in its broadest aspects, includes a row of evenly spaced discrete samples, conditioning means for effecting a change in a physical characteristic of each sample in accordance with a constituent thereof, detecting means for determining such change, timed drive means for effecting relative movement of the conditioning and detecting means with respect to the row of samples, and means for mounting the conditioning and detecting means in adjustable spaced relation to each other for selectively varying the length of time each sample is subjected to conditioning.

As here shown, the samples 11 are supported in conveying means 12, 13 and 14 which are formed for transporting rows of evenly spaced discrete samples along a predetermined path of movement. This path of movement may proceed in a straight line or may describe circles, arcs or other curvilinear configurations. In the apparatus shown in FIGURE 1 of the drawings, the rows of samples proceed along a straight line in the conveying means 12 and are selectively transferred onto cyclic modules 13 and 14 which have rows of sample compartments traveling along circular paths.

Preferably, the drive 16 for the conveying means 12, and the drives 17 and 18 for the conveying means 13 and 14, provide an intermittent stop and go movement of the samples along the described paths. The drives 16, 17 and 18 may be of any suitable type. For example, drive 16 for the linear module 12 may conveniently consist of an electric motor 19 driving a chain 21 which is engaged with block members 22 having the desired sample-containing compartments formed therein.

The drives 17 and 18 for cyclic modules 13 and 14 may conveniently consist of electric motors 23 operable to rotate turntables 24 and 25 through alternate engagement of pins 27 and 28 with slots 29 formed in the peripheral edge of a turntable member 31.

In choosing the particular type of conveying means, the means 12 providing linear movement is generally preferred where the apparatus conveying the samples through the sample stations requires some kind of cleaning or renovation between samples, while the circular movement is preferred where the sample stations are cleaned automatically and do not require associated equipment needing cleaning and/or replacement of parts.

Referring more particularly to module 12, there is shown a series of sample holding blocks 22, each containing a series or group of rows of sample containers in the form of compartments 32. As here shown, three longitudinally extending rows of the compartments 32 are formed in parallel spaced relation. Specifically, the blocks 22 are here adapted to receive samples, to combine a measured quantity of sample and precipitating reagent, and to filter the precipitate formed by the reagent so as to provide a filtrate in the sample containers in row 94. In this way, a filtrate of a sample is provided which has one or more components removed. For example, blood samples may be treated in this fashion to remove protein therefrom.

The structure of the filter block 22 is the subject of a copending patent application of Hans Baruch, the inventor of the present invention, and Dalny Travaglio, Serial No. 207,122, filed July 2, 1964, entitled Sample Conveying and Conditioning Unit, and assigned to the same assignee as the present application.

Generally, the filter blocks 22 are moved along the conveyor by the chain 21 with the lower edges of the blocks riding on idler rollers 33. The blocks are generally fed in one end of the conveyor with the samples in place, and are removed at the far end of the conveyor after they have passed by the last module of equipment. The blocks are then cleaned and replaced with new filters so as to be suitable for new passes through the apparatus. A typical apparatus for conveying the filter blocks through the associated equipment is described more fully and claimed in the copending application of Hans Baruch, the inventor of the present invention, and Dalny Travaglio, Serial No. 207,123, filed July 2, 1962, entitled Apparatus for Conducting Analytical Procedural Steps, and assigned to the same assignee as the present application.

Cyclic modules 13 and 14 are similarly constructed and each includes turntables 24 or 25 which are rotated according to a timed movement by drives 17 and 18, the turntables here providing an outer circular row of sample containers 26a and an inner circular row of sample containers 26b. The turntable also has probes 34 associated therewith as well as transfer devices for moving samples between modules. A fuller discussion of the turntable drives utilized herein is to be found in the copending application of Hans Baruch, the inventor in the present application, and Dalny Travaglio, Serial No. 207,121, filed July 2, 1962, entitled Apparatus for Performing Analytical Procedures, and assigned to the assignee of the present invention.

A typical transfer device 15 which may be used in the present invention is illustrated in detail in FIGURE 2. As there shown, the device comprises a probe or pipette 34 which is mounted for movement on a movable mount 36, pumps 37 and 38, reagent or diluent container 39, and valves 41 which provide communication of the pumps with either a pressure line 42 or a vacuum line 43. The valve 41 may be any valve capable of providing the position shown with valve blocks 44 and 46 aligned as shown in FIGURE 2 and movable so as to be aligned as shown in phantom in FIGURE 2. A typical valve and mechanism suitable for operating the same is described and claimed in the copending application Serial No. 183,506 of Erik W. Anthon entitled, "Valve," and filed March 29, 1962, and assigned to the assignee of the present application.

Both pumps 28 and 29 are similarly constructed and adapted to operate by means of air pressure or vacuum with the air pressure causing each of the pumps to move a piston or plunger in one direction and the vacuum causing each of them to move the piston in reverse direction. Thus each pump comprises a housing 47 enclosing chambers 48 and 49 with chambers 49 adapted to activate a piston 51 which communicates down into chamber 48 and effects movement of liquid into and out of the chamber depending upon the valve positions in the associated lines.

In order to accurately adjust the volume of liquid taken into the chambers 48, stop means 52 are provided to limit the movement of the piston 51. In order to adjust the stop means 52, knurled handle 53 is rotated which moves stop means 52 through a sealed threaded engagement with the housing 47 as shown in FIGURE 2. The setting may be accurately adjusted on a suitable gauge 54 which may include a vernier device (not shown) or any other conventional measuring scale for providing accurate measurements.

In the operation of the transfer device, the probe 34 is moved to the position shown in FIGURE 2 when liquid is being discharged from the probe into a receiving container 56. This discharge is effected because pressurized air enters through line 42 and communicates through lines 57 and 58 to the chambers 49 and forces the pistons 51 downwardly. This causes chambers 48 to be decreased in volume so that liquid from the upper chamber 48 goes through lines 59 and 61 through lower chamber 48, and the material in both upper and lower chambers 48 then passes through line 62 and out through the probe as indicated above. Movable mount 36 then positions the probe for receiving the next sample.

When the sample is taken in through the probe, reagent or diluent is also taken into upper chamber 48 of the pump 37 provided for this purpose. This is effected by moving valve 41 so that the block 46 and its passages are in the position as shown in phantom. Line 57 is then in communication with suction line 43 through passage 63 while the pressure line 42 is in communication with the atmosphere through passage 64. Similarly, passage 66 connects line 59 with line 67 leading to the reservoir or container 39. With line 57 connected to vacuum, pistons 51 are urged upwardly. This causes the upper chamber 48 to draw reagent or diluent from the reservoir through line 59 and line 67 communicating therewith, while the lower chamber 48 draws sample up into the probe as liquid is drawn back in line 62. It should be noted that line 61 is closed during this operation so that no diluent or reagent is in communication with the lower chamber. This system is capable of taking in accurately measured quantities of sample and diluent or reagent and dispensing them, with the reagent or diluent following the sample so as to flush the probe clean for the next cycle of operation. Alternatively, a system may be employed which is capable of taking in an excess quantity of sample and dispensing a precisely measured aliquot thereof, the excess sample serving to wash out the probe before the dispensed portion of the sample is taken in. The latter system is particularly suitable where it is not desired to add diluent or reagent. A suitable system for washing out with a measured quantity of reagent or diluent is more fully described and claimed in the copending application of Hans Baruch, the inventer of the present invention, and Erik W. Anthon, Serial No. 207,-111, filed July 2, 1962, entitled Automatic Sample Handling Apparatus and assigned to the same assignee as the present invention. A typical apparatus for washing out with additional sample is more fully described and claimed in the copending application of Erik W. Anthon, Serial No. 207,119, filed July 2, 1962, entitled Sample Handling Apparatus, and assigned to the same assignee as the present application. The exterior of the probe should be made hydrophobic and in such case it often will not be necessary to clean the exterior of the probe. However it should be apparent that rinsing of the probe between samples could be provided, if required.

In FIGURE 3, there is shown a liquid delivery means 68 which is similar to portions of the device of FIGURE 2. The device 68 comprises a pump 71 which is similar in construction to the pumps 37 and 38, a reagent container 72 and a valve 73 which is similar to the valve 41 of FIGURE 2.

Since the valve 63 and pump 61 are similarly constructed to the valve 32 and pumps 28 and 29 of FIGURE 2, the description above is referred to and similar parts are labeled with similar reference numbers. It will be appreciated that different pump systems could be used or other reagent delivery devices may be satisfactory for certain applications. However, where precise volumes are to be delivered, I prefer to use an apparatus capable of the performance obtained by that shown in FIGURE 3, where the delivered volume may be carefully adjusted on gauge 54 so as to adjust the stroke of piston 51 and hence the volumetric displacement of piston 51 in chamber 48.

The upward movement of piston 51 is determined by the setting of adjustment screws 74 according to the indicia shown on gauge 54. In this way, accurately controlled volumes of reagents are brought into chambers 48 and delivered therefrom through probes 34 or 69 in accordance with the positioning of the valves 41 or 73.

In general, any transfer device capable of providing the required motion to the probe may be used. Certain structures capable of providing this motion have been developed and all or part of these machines may be used. For example, a typical device is described in the patent application of Erik W. Anthon, Serial No. 61,206, entitled, "Materials Handling Apparatus," filed October 7, 1960. As here shown, the upward and downward motion of the probe is transferred from movable mount 36 by moving the mount from the position shown to the position shown in phantom by activation of levers 76 which in turn moves the movable mount through collar 81. Lever 76 may conveniently be reciprocated by a motor 77 having an eccentric drive connection 78 thereto.

Rotational movement of the probe may be provided by any known means 79 of providing rotational motion, with such means having an operative connection to collar 81. Alternatively, other lateral movement of the probe may be provided such as transverse motion which may be obtained by slidably mounting movable mount 36 on a guideway and imparting lateral movement through conventional cam means rotated in timed fashion by a motor. The rotational movement of the probe may be preferred where the probe is located on a cyclic module as illustrated in FIGURE 1.

In order to illustrate the operation of the system of combined modules shown in FIGURE 1, the treatment of a blood sample will be described as it passes through the various pieces of equipment shown. The blood sample is loaded into a group of sample containers in row 82, the number used depending upon the number of analyses required. For example, if two samples are to be analyzed in whole blood form, and two determinations made on serum, four of the compartments or wells 32 on row 82 are loaded. The samples of whole blood which are to be measured pass by transfer device 68a unaffected, while the samples which are to be analyzed for components in serum are moved by transfer device 68a from row 82 to row 83.

Transfer device 68a is similar to that shown in FIGURE 2, but movable member 36 carrying the probe 34 is provided with transverse motion as shown by the arrow 84. In row 82, a reagent is added which will coagulate or precipitate protein material and leave a protein-free blood serum sample. The sample which is in row 83 is allowed to stand as the samples are moved upward from station to station until the samples reach transfer device 86. At this time, all of the protein is sufficiently coagulated that filtration may be effected.

Transfer device 86 moves the slurry from row 83 into row 87 where filtration is carried out. This transfer device comprises a movable support 88 which carries an inverted U-shaped tube 89 adapted to fit down into the bottom of the wells of row 83 and deliver from the other end into one of the wells in row 87, and a pressure cap 91 which sealingly fits into the upper end of the wells in row 83. As air pressure is forced in through the cap, the sample is forced out through the tube into the row 87. If desired, other means could be used to effect this change, but I find the device illustrated to be eminently satisfactory. From row 87, the liquid passes downward through a filter 92 at the bases of the wells in row 87 through channels 93 into the wells of row 94. In this way, samples of whole blood are carried by the conveyor in row 82 and samples of deproteinized blood are carried in rows 94.

As the samples are conveyed along in linear fashion, they come first to the site of the transfer device 15a associated with module 13. In this device, transfers of whole blood from row 82 of module 12 to the outer row of 26a of turntable 24 of module 13 is accomplished. Each of the samples of blood is here conditioned, if desired, by treatment with controlled temperatures for a fixed time period and/or addition of any reagent required by any of probes 94.

The probes 94 are positioned close to the central axis of the turntable so as to be capable of communicating with a number of stations in row 26a or 26b, and the number of probes may be varied to suit the particular analysis procedures desired. Such blood sample is carried around the row 26a until it reaches transfer device 15b, where it is moved to the inner row 26b if desired. After suitable treatment, the blood sample is pumped out through one of the probes 94 and into a sensing unit, such as a colorimeter, for final measurement and determination of the desired component.

The blood samples which have been deproteinized pass module 13 and continue until they reach the transfer device 15c of module 14. At module 14, the samples are treated with probes 94 and with other mechanisms as described above for module 13 according to the preset program for the various samples brought into the module. The treated samples are then delivered into a suitable measuring device for the final analyses.

As shown in FIGURE 5, the described combination of modules provides an automated system in which the samples are analyzed through the entire procedure. Thus the samples pass through the lineal module in which certain samples are deproteinized. Both types of samples then pass through the cyclic modules where further reagents and/or heat are added. From there, the samples are transferred to colorimeters for measurement, and these measurements are recorded on a digital printer to show each determination for each of the blood samples.

In accordance with the present invention and as an important feature thereof, precise control over the chemical reaction times and other conditioning procedures is accomplished by merely moving the various probes from one station to another. In this manner the length of time each sample is subjected to conditioning may be selected merely by moving the probes so as to change the number of stations therebetween. For this to be effective, it is necessary that the samples be moved from one station to the next in equal increments of time, that is, the time period from the moment the sample is moved into a new station to the moment it is moved into the next station, must have precisely the same duration as any corresponding time period.

Suitable control over the described increments of time may be provided by a master timer 101 and an actuating means 102 for activating the conveyor drives 17, 18 and 19 and the various conditioning and detecting components so as to effect operation thereof in the desired sequence. Master timer 101 provides precisely timed signals for starting each cycle or sequence of operation and the means 102 insures that the various devices complete their operations at the proper times during the cycle. The master timer 101 may be of any suitable type which is capable of producing a mechanical or electrical signal at intervals of precisely the same duration. In the schematic circuit illustrated in FIGURE 6, a timer producing equally spaced electrical impulses is employed.

The activating means 102 may comprise limit switches, auxiliary timers or other devices for activating the components in desired sequence. As here shown, the means 102 includes a rotary stepping switch having a synchronous drive motor 103 for rotating a switch arm 104 along a desired number of contacts A through I, these contacts being adapted for providing starting signals to the drive means for the various components.

In operation, the impulse from master timer 101 starts the stepping switch motor 103 as well as the conveyor drives 17, 18 and 19. The latter move the samples to the next station and then halt the conveyors until the next impulse is received from timer 101. The movement of the samples takes place while stepping switch arm 104 is moving from contact I to contact A, and the activation of the various transfer and conditioning devices normally occurs while the conveyors are halted.

When switch arm 104 reaches contact A, a starting signal is transmitted to the control means for motor 77 which acts through eccentric 78 and lever 76 to lower the probe into the sample. As soon as this is accomplished, a return signal from means such as a limit switch or auxiliary timer causes switch motor 103 to move arm 104 to contact B. This contact signals the control means for a drive motor 106 which actuates valve 41, causing liquid sample to be drawn into the illustrated probe. Limit switch 107 halts motor 106 and starts switch motor 103. In this manner, switch arm 104 progresses along the contacts and actuates the components to lift the probe, rotate it to a different sample station, lower the probe, dispense sample therefrom, lift the probe and return it to the original position. Of course, the particular cycle illustrated is merely typical of one type of programming arrangement, and other cycles may be used as required.

Provision for the most efficient use of the apparatus with the particular modules chosen is afforded by utilizing a master timer which is adjustable as to the duration of the equal increments of time between starting pulses. Thus, the duration control knob 109 can be rotated to decrease the duration to just enough time for all of the various operations in the cycle to take place.

From the foregoing description, it is seen that I have provided a group of modules capable of performing various treatments on blood samples or other samples that may be used for other biological or other chemical analyses. It is also seen that these modules are capable of conducting some of the more difficult manipulative steps used in analyses such as filtration, heating, precipitation, addition of free reagents and heat incubation. In this way, these complicated operations are carried out automatically in a comparatively simple structure, yet which structure has all of the advantages of automated equipment in uniformity of operation and the other advantages mentioned hereinbefore.

I claim:

1. An apparatus for automatically conducting analytical procedural steps, comprising a row of evenly spaced discrete samples, conditioning means including means for adding a conditioning agent for effecting a change in a physical characteristic of each sample in accordance with a constituent thereof, detecting means for determining said change in a physical characteristic of each sample, timed drive means for effecting relative movement of said rows of samples with respect to said conditioning and detecting means in equal increments of distance and time, and means for mounting said means for adding a conditioning agent and detecting means in adjustable spaced relation to each other for selectively varying the length of time each sample is subjected to conditioning.

2. An apparatus for automatically conducting analytical procedural steps, comprising a row of evenly spaced discrete samples, conditioning means including means for adding a conditioning agent for effecting a change in a physical characteristic of each sample in accordance with a constituent thereof, detecting means for determining said change in a physical characteristic of each sample, timed drive means for effecting intermittent stop and go relative movement of said row of samples with respect to said conditioning and detecting means in equal increments of distance and time, and means for mounting said means for adding a conditioning agent and detecting means in adjustable spaced relation to each other for selectively varying the length of time each sample is subjected to conditioning.

3. An apparatus for automatically conducting analytical procedural steps, comprising conveying means formed for transporting a row of evenly spaced discrete samples along a path of movement, drive means connected to said conveying means for advancing said samples simultaneously by equal increments of distance in equal increments of time in response to a series of timed signals, means for providing said series of timed signals at equal intervals of time for accurately timing the opperation of the drive means, conditioning means including means for adding a conditioning agent for effecting a change in a physical characteristic of each sample in accordance with a constituent thereof, detecting means for determining said change in a physical characteristic of each sample, and means for positioning said means for adding a conditioning agent and said detecting means at selected stations along said path of movement of the samples whereby the length of time each sample is subjected to conditioning may be selectively varied.

4. An apparatus for automatically conducting analytical procedural steps, comprising conveying means formed for transporting a row of evenly spaced discrete samples along a path of movement, drive means connected to said conveying means for advancing said samples simultaneously by equal increments of distance in equal increments of time, conditioning means including means for adding a conditioning agent to the samples for effecting a change in a physical characteristic of each sample in accordance with a constituent thereof, detecting means for determining said change in a physical characteristic of each sample, actuating means for activating said drive means and said means for adding a conditioning agent and detecting means to effect cyclic operation in desired sequence, a timer connected to said actuating means and formed for transmitting equally spaced starting signals to the actuating means for initiating said sequence, and control means for selectively adjusting the length of the time periods between said equally spaced starting signals for reducing such length of time to the minimum required for the said cyclic operation of the particular drive, means for adding a conditioning agent and detecting means employed.

5. An apparatus for automatically conducting analytical procedural steps, comprising conveying means formed for transporting a row of evenly spaced discrete samples along a path of movement, drive means connected to said conveying means for advancing said samples in intermittent stop and go movement between equally spaced stations along said path simultaneously and by equal increments of distance in equal increments of time, conditioning means including means for adding a reagent for effecting a change in a physical characteristic of each sample in accordance with a constituent thereof, detecting means for determining said change in a physical characteristic of each sample, said detecting means being operable when said samples are halted at said stations, actuating means for activating said drive means and said means for adding a reagent and detecting means to effect cyclic operation in desired sequence, a timer connected to said actuating means and formed for transmitting equally spaced starting signals to the actuating means for initiating said sequence, control means for selectively adjusting the length of the time periods between said equally spaced starting signals for reducing such length of time to the minimum required for said cyclic operation of the particular drive, means for adding the reagent and detecting means employed, and means for adjustably positioning said means for adding reagent and said detecting means at desired stations along said path of movement of the samples whereby the length of time each sample is subjected to conditioning may be selectively varied.

6. An apparatus for automatically conducting analytical procedural steps, comprising conveying means formed for transporting a row of evenly spaced discrete samples along a path of movement, drive means connected to said conveying means for advancing said samples in intermittent stop and go movement between equally spaced stations along said path simultaneously and by equal increments of distance in equal increments of time, said drive means being actuated by a series of timed signals, means for providing said series of time signals at equal intervals of time for accurately timing the operation of the drive means, conditioning means including means for adding a reagent for effecting a change in a physical characteristic of each sample in accordance with a constituent thereof, detecting means for determining said change in a physical characteristic of each sample, said detecting means being operable when said samples are halted at said stations, transfer means for transporting conditioned samples to said detecting means and having a sample intake for receiving samples from said row, and means for adjustably positioning said means for adding a reagent and said sample intake of said transfer means at desired stations along said path of movement of the samples whereby the length of time each sample is subjected to conditioning may be selectively varied.

7. An apparatus for automatically conducting analytical procedural steps as described in claim 6 and wherein said transfer means includes a pump means capable of transferring liquid samples from said row to said detecting means in a form which is essentially free of contamination by prior liquid samples transferred.

8. An apparatus for automatically conducting analytical procedural steps as described in claim 7 and wherein said pump means is formed for taking up a measured quantity of liquid sample when the same intake is in operative position at the desired station and for delivering said liquid sample together with a measured quantity of further liquid to the detecting means, said pump means first delivering the liquid sample taken up in the sample intake and then delivering the further liquid whereby the sample intake is washed free from contamination by the sample material taken up.

9. An apparatus for automatically conducting analytical steps as described in claim 7 and wherein said pump means is formed for taking up a measured quantity of liquid sample in the sample intake from a sample station when the sample intake is in operative position at a desired station and for delivering a measured quantity of liquid sample to said detecting means, said pump means delivering less liquid sample to said detecting means than is taken in through said sample intake whereby substantially uncontaminated liquid sample is delivered to the detecting means.

10. An apparatus for automatically conducting analytical procedural steps, comprising conveying means formed for transporting a row of evenly spaced discrete samples along a path of movement, timed drive means connected to said conveying means for advancing said samples in intermittent stop and go movement between equally spaced stations along said path simultaneously and by equal increments of distance in equal increments of time, transfer means for adding reagents to the samples at a selected station for effecting a change in a physical characteristic of each sample in accordance with a constituent thereof, detecting means for determining said change in a physical characteristic of each sample, said detecting means being operable when said samples are halted at said stations, means for adjustably positioning said transfer means and said detecting means at desired stations along said path of movement of the samples whereby the length of time each sample is subjected to added reagents may be selectively varied, means for activating said drive means and said transfer means and detecting means to effect cyclic operation in desired sequence, a timer connected to said actuating means and formed for transmitting equally spaced starting signals to the actuating means for initiating said sequence, and control means for selectively adjusting the length of the time periods between said equally spaced starting signals for reducing such length of time to the minimum required for the said cyclic operation of the particular drive, transfer means and detecting means employed.

11. An apparatus for automatically conducting analytical procedural steps, comprising conveying means formed for transporting rows of evenly spaced discrete samples along linear and cyclic paths of movement, timed drive means connected to said conveying means for advancing said samples in intermittent stop and go movement between equally spaced stations along said paths of movement simultaneously and by equal increments of distance and equal increments of time, in response to a series of timed signals, means for providing said series of timed signals at equal intervals of time for accurately timing the operation of the drive means, conditioning means including means for adding a conditioning agent for effecting a change in a physical characteristic of each sample in accordance with a constituent thereof, detecting means for determining said change in a physical characteristic of each sample, transport means for transferring samples between said rows, and means for positioning said means for adding a conditioning agent and said detecting means at selected stations along said paths of movement of the samples whereby the length of time each sample is subjected to conditioning may be selectively varied.

12. An apparatus for automatically conducting analytical procedural steps as described in claim 10 and wherein said transfer means includes a pump means capable of transferring liquid samples from said row to said detecting means in a form which is essentially free of contamination by prior liquid samples transferred.

13. An apparatus for automatically conducting analytical procedural steps as described in claim 12 and wherein said pump means is formed for taking up a measured quantity of liquid sample when the sample intake is in operative position at the desired station and for delivering said liquid sample together with a measured quantity of further liquid to the detecting means, said pump means first delivering the liquid sample taken up in the sample intake and then delivering the further liquid whereby the sample intake is washed free from contamination by the sample material taken up.

14. An apparatus for automatically conducting analytical steps as described in claim 12 and wherein said pump means is formed for taking up a measured quantity of liquid sample in the sample intake from a sample station when the sample intake is in operative position at a desired station and for delivering a measured quantity of liquid sample so said detecting means, said pump means delivering less liquid sample to said detecting means than is taken in through said sample intake whereby substantially uncontaminated liquid sample is delivered to the detecting means.

References Cited by the Examiner
UNITED STATES PATENTS

| | | | |
|---|---|---|---|
| 2,879,141 | 3/59 | Skeggs | 23—253 |
| 3,081,158 | 3/63 | Winter | 23—253 |
| 3,098,719 | 7/63 | Skeggs | 210—324 X |

MORRIS O. WOLK, *Primary Examiner.*

DELBERT E. GANTZ, *Examiner.*

Dedication 3,193,358.—*Hans Baruch*, Berkeley, Calif. AUTOMATED ANALYTICAL APPARATUS. Patent dated July 6, 1965. Dedication filed Mar. 2, 1970, by the assignee, *American Optical Corporation*.

Hereby dedicates the remaining term of said patent to the Public.

[*Official Gazette July 7, 1970.*]